(12) United States Patent
Stoewe et al.

(10) Patent No.: US 7,618,089 B2
(45) Date of Patent: Nov. 17, 2009

(54) AIR CONDITIONING SYSTEM FOR A SEAT

(75) Inventors: Stefan Stoewe, Mering (DE); Thomas Ulbrich, Erdweg (DE); Jens Harnisch, Mering (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 370 days.

(21) Appl. No.: 11/405,904

(22) Filed: Apr. 18, 2006

(65) Prior Publication Data

US 2006/0249995 A1 Nov. 9, 2006

(30) Foreign Application Priority Data

Apr. 20, 2005 (DE) .................. 10 2005 018 445

(51) Int. Cl.
*A47C 7/72* (2006.01)
(52) U.S. Cl. .................. 297/180.13; 297/180.14; 297/452.47; 454/120
(58) Field of Classification Search ............ 297/180.13, 297/180.14, 452.46, 452.47; 454/120
See application file for complete search history.

(56) References Cited

U.S. PATENT DOCUMENTS

| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |

(Continued)

FOREIGN PATENT DOCUMENTS

CA 1266925 3/1990

(Continued)

OTHER PUBLICATIONS

Provisional U.S. Appl. No. 60/428,003, filed Nov. 21, 2002, (Patent Nos. 6,857,697; 6,869,139; 7,083,227; and 7,131,689 claiming priority) (Patent Publication Nos. 2007/0001507 and 2007/0158994 claiming priority).

(Continued)

*Primary Examiner*—Anthony D Barfield
(74) *Attorney, Agent, or Firm*—Dobrusin & Thennisch PC

(57) ABSTRACT

An air-conditioning system for a seat includes a cushion having a cover and two air-conditioned zones proximate a surface facing a seat occupant, and an elongated depression between the zones, the depression having a floor which is recessed with respect to the zones and into which the cover is at least partially drawn into in the direction of the depression floor, the air-conditioned zones being at least partially distanced from the depression. The zones and the depression are connected by a plurality of air-permeable channels, the channels being located between the air-conditioned zones essentially on or above the depression floor. The depression, in the transverse direction, is at least partially air-permeable, despite the cover.

12 Claims, 3 Drawing Sheets

U.S. PATENT DOCUMENTS

| | | |
|---|---|---|
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,137,523 A | 6/1964 | Karner |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,628,829 A | 12/1971 | Hellig |
| 3,638,255 A | 2/1972 | Sterrett |
| 3,653,589 A | 4/1972 | McGrath |
| 3,653,590 A | 4/1972 | Elsea |
| 3,681,797 A | 8/1972 | Messner |
| 3,684,170 A | 8/1972 | Roof |
| 3,732,944 A | 5/1973 | Kendall |
| 3,736,022 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,044,221 A | 8/1977 | Kuhn |
| 4,060,276 A | 11/1977 | Lindsay |
| 4,065,936 A | 1/1978 | Fenton et al. |
| 4,072,344 A | 2/1978 | Li |
| 4,141,585 A | 2/1979 | Blackman |
| 4,175,297 A | 11/1979 | Robbins et al. |
| 4,245,149 A | 1/1981 | Fairlie |
| 4,259,896 A | 4/1981 | Hayashi et al. |
| 4,335,725 A | 6/1982 | Geldmacher |
| 4,379,352 A | 4/1983 | Hauslein et al. |
| 4,391,009 A | 7/1983 | Schild et al. |
| 4,413,857 A | 11/1983 | Hayashi |
| 4,509,792 A | 4/1985 | Wang |
| 4,563,387 A | 1/1986 | Takagi et al. |
| 4,572,430 A | 2/1986 | Takagi et al. |
| 4,589,656 A | 5/1986 | Baldwin |
| 4,665,707 A | 5/1987 | Hamilton |
| 4,671,567 A | 6/1987 | Frobose |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,964,674 A | 10/1990 | Altmann et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,076,643 A | 12/1991 | Colasanti et al. |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,516,189 A | 5/1996 | Ligeras |
| 5,524,439 A | 6/1996 | Gallup et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,639,145 A | 6/1997 | Alderman |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,897,162 A | 4/1999 | Humes et al. |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,049,927 A | 4/2000 | Thomas et al. |
| 6,059,018 A | 5/2000 | Yoshinori et al. |
| 6,059,362 A | 5/2000 | Lin |
| 6,062,641 A | 5/2000 | Suzuki et al. |
| 6,064,037 A | 5/2000 | Weiss et al. |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,109,688 A | 8/2000 | Wurz et al. |
| 6,119,463 A | 9/2000 | Bell |
| 6,124,577 A | 9/2000 | Fristedt |

| | | | | | | |
|---|---|---|---|---|---|---|
| 6,145,925 | A | 11/2000 | Eksin et al. | 7,083,227 B2 | 8/2006 | Brennan et al. |
| 6,147,332 | A | 11/2000 | Holmberg et al. | 7,100,978 B2 | 9/2006 | Ekern et al. |
| 6,164,719 | A | 12/2000 | Rauh | 7,114,771 B2 | 10/2006 | Lofy et al. |
| 6,179,706 | B1 | 1/2001 | Yoshinori et al. | 7,131,689 B2 | 11/2006 | Brennan et al. |
| 6,186,592 | B1 | 2/2001 | Orizaris et al. | 7,201,441 B2 | 4/2007 | Stoewe et al. |
| 6,189,966 | B1 * | 2/2001 | Faust et al. ............ 297/180.14 | 7,213,876 B2 | 5/2007 | Stoewe |
| 6,196,627 | B1 | 3/2001 | Faust et al. | 7,322,643 B2 * | 1/2008 | Ishima et al. .......... 297/180.13 |
| 6,223,539 | B1 | 5/2001 | Bell | 7,338,117 B2 | 3/2008 | Iqbal et al. |
| 6,224,150 | B1 | 5/2001 | Eksin et al. | 7,356,912 B2 | 4/2008 | Iqbal et al. |
| 6,237,675 | B1 | 5/2001 | Oehring et al. | 2001/0035669 A1 | 11/2001 | Anderson et al. |
| 6,254,179 | B1 | 7/2001 | Kortume et al. | 2002/0003363 A1 | 1/2002 | Buss et al. |
| 6,263,530 | B1 | 7/2001 | Feher | 2002/0017102 A1 | 2/2002 | Bell |
| 6,273,810 | B1 | 8/2001 | Rhodes et al. | 2002/0067058 A1 | 6/2002 | Pfahler |
| 6,277,023 | B1 | 8/2001 | Schwartz | 2002/0092308 A1 | 7/2002 | Bell |
| 6,278,090 | B1 | 8/2001 | Fristedt et al. | 2002/0096915 A1 | 7/2002 | Haupt et al. |
| 6,291,803 | B1 | 9/2001 | Fourrey | 2002/0096931 A1 | 7/2002 | White et al. |
| 6,300,150 | B1 | 10/2001 | Venkatasubramanian | 2002/0105213 A1 | 8/2002 | Rauh et al. |
| 6,321,996 | B1 | 11/2001 | Odebrecht et al. | 2002/0108381 A1 | 8/2002 | Bell |
| 6,415,501 | B1 | 7/2002 | Schlesselman | 2002/0139123 A1 | 10/2002 | Bell |
| 6,425,637 | B1 | 7/2002 | Peterson | 2002/0140258 A1 | 10/2002 | Ekern et al. |
| 6,434,328 | B2 | 8/2002 | Rutherford | 2002/0148234 A1 | 10/2002 | Bell |
| 6,478,369 | B1 | 11/2002 | Aoki et al. | 2002/0148235 A1 | 10/2002 | Bell |
| 6,481,801 | B1 | 11/2002 | Schmale | 2002/0148236 A1 | 10/2002 | Bell |
| 6,483,087 | B2 | 11/2002 | Gardner et al. | 2002/0148345 A1 | 10/2002 | Hagiwari |
| 6,491,578 | B2 | 12/2002 | Yoshinori et al. | 2002/0150478 A1 | 10/2002 | Aoki |
| 6,497,275 | B1 | 12/2002 | Elliot | 2003/0005706 A1 | 1/2003 | Bell |
| 6,501,055 | B2 | 12/2002 | Rock et al. | 2003/0024924 A1 | 2/2003 | Fristedt |
| 6,505,886 | B2 | 1/2003 | Gielda et al. | 2003/0029173 A1 | 2/2003 | Bell et al. |
| 6,511,125 | B1 | 1/2003 | Gendron | 2003/0079770 A1 | 5/2003 | Bell |
| 6,539,725 | B2 | 4/2003 | Bell | 2003/0084935 A1 | 5/2003 | Bell |
| 6,541,737 | B1 | 4/2003 | Eksin et al. | 2003/0102699 A1 | 6/2003 | Aoki et al. |
| RE38,128 | E | 6/2003 | Gallup et al. | 2003/0150229 A1 | 8/2003 | Aoki et al. |
| 6,578,910 | B2 | 6/2003 | Andersson et al. | 2004/0036326 A1 | 2/2004 | Bajic |
| 6,592,181 | B2 | 7/2003 | Stiller et al. | 2004/0090093 A1 | 5/2004 | Kamiya et al. |
| 6,598,405 | B2 | 7/2003 | Bell | 2004/0104607 A1 | 6/2004 | Minegishi et al. |
| 6,604,785 | B2 | 8/2003 | Bargheer et al. | 2004/0118555 A1 | 6/2004 | Fristedt |
| 6,606,866 | B2 | 8/2003 | Bell | 2004/0139758 A1 | 7/2004 | Kamiya et al. |
| 6,619,736 | B2 | 9/2003 | Stowe et al. | 2004/0189061 A1 | 9/2004 | Hartwick et al. |
| 6,619,737 | B2 | 9/2003 | Kunkel et al. | 2004/0195870 A1 | 10/2004 | Bohlender et al. |
| 6,625,990 | B2 | 9/2003 | Bell | 2004/0245811 A1 | 12/2004 | Bevan et al. |
| 6,626,386 | B1 | 9/2003 | Stiner et al. | 2005/0173950 A1 | 8/2005 | Bajic et al. |
| 6,626,455 | B2 | 9/2003 | Webber et al. | 2005/0200179 A1 | 9/2005 | Bevan et al. |
| 6,626,488 | B2 | 9/2003 | Pfahler | 2005/0257541 A1 | 11/2005 | Kadle et al. |
| 6,629,724 | B2 | 10/2003 | Ekern et al. | 2006/0048518 A1 | 3/2006 | Bell |
| 6,629,725 | B1 | 10/2003 | Kunkel et al. | 2006/0059933 A1 | 3/2006 | Axakov et al. |
| 6,682,140 | B2 | 1/2004 | Minuth et al. | 2006/0060344 A1 | 3/2006 | Esaki |
| 6,685,553 | B2 * | 2/2004 | Aoki ................... 297/180.14 X | 2006/0103183 A1 | 5/2006 | White et al. |
| 6,719,624 | B2 | 4/2004 | Hayashi et al. | 2006/0130490 A1 | 6/2006 | Petrovski |
| 6,722,148 | B2 | 4/2004 | Aoki et al. | 2006/0197363 A1 | 9/2006 | Lofy et al. |
| 6,733,072 | B2 * | 5/2004 | Jaillet et al. ............ 297/180.13 | 2006/0208540 A1 | 9/2006 | Lofy et al. |
| 6,761,399 | B2 | 7/2004 | Bargheer et al. | 2006/0214480 A1 | 9/2006 | Terech |
| 6,767,621 | B2 | 7/2004 | Flick et al. | 2007/0001507 A1 | 1/2007 | Brennan et al. |
| 6,786,541 | B2 | 9/2004 | Haupt et al. | 2007/0158994 A1 | 7/2007 | Brennan et al. |
| 6,786,545 | B2 | 9/2004 | Bargheer et al. | 2007/0176470 A1 | 8/2007 | Stoewe |
| 6,793,016 | B2 | 9/2004 | Aoki et al. | 2007/0245760 A1 | 10/2007 | Stoewe |
| 6,808,230 | B2 | 10/2004 | Buss et al. | 2007/0296251 A1 | 12/2007 | Krobok et al. |
| 6,817,675 | B2 | 11/2004 | Buss et al. | | | |
| 6,828,528 | B2 | 12/2004 | Stowe et al. | | FOREIGN PATENT DOCUMENTS | |
| 6,840,576 | B2 | 1/2005 | Ekern et al. | | | |
| 6,848,742 | B1 | 2/2005 | Aoki et al. | CA | 2393970 | 6/2001 |
| 6,857,697 | B2 | 2/2005 | Brennan et al. | DE | 2513909 A1 | 10/1986 |
| 6,869,139 | B2 | 3/2005 | Brennan et al. | DE | 3705756 A1 | 10/1988 |
| 6,869,140 | B2 | 3/2005 | White et al. | DE | 4112631 | 4/1992 |
| 6,871,696 | B2 | 3/2005 | Aoki et al. | DE | 19503291 A1 | 8/1996 |
| 6,886,352 | B2 | 5/2005 | Yoshinori et al. | DE | 19654370 | 3/1998 |
| 6,892,807 | B2 | 5/2005 | Fristedt et al. | DE | 19736951 A1 | 3/1999 |
| 6,893,086 | B2 | 5/2005 | Biajic et al. | DE | 19737636 | 3/1999 |
| 6,929,322 | B2 | 8/2005 | Aoki et al. | DE | 19805174 C1 | 6/1999 |
| 6,957,545 | B2 | 10/2005 | Aoki | DE | 19810936 C2 | 6/1999 |
| 7,229,129 | B2 | 10/2005 | White et al. | DE | 19810936 A1 | 9/1999 |
| 6,976,734 | B2 | 12/2005 | Stoewe | DE | 19920451 A1 | 12/1999 |
| 7,040,710 | B2 | 5/2006 | White et al. | DE | 19954978 C1 | 1/2001 |
| 7,052,091 | B2 | 5/2006 | Bajic et al. | DE | 10001314 A1 | 7/2001 |

| | | |
|---|---|---|
| DE | 10013492 | 9/2001 |
| DE | 10024880 C1 | 9/2001 |
| DE | 10030708 A1 | 1/2002 |
| DE | 10144839 | 3/2003 |
| DE | 10241571 | 3/2004 |
| DE | 10261902 | 8/2004 |
| DE | 10316732 | 10/2004 |
| DE | 10338525 | 3/2005 |
| DE | 10346064 | 4/2005 |
| EP | 0128534 | 12/1984 |
| EP | 0280213 | 8/1988 |
| EP | 0517615 | 12/1992 |
| EP | 0517615 A1 | 12/1992 |
| EP | 411375 B1 | 5/1994 |
| EP | 0809576 B1 | 5/1999 |
| EP | 0936105 A1 | 8/1999 |
| EP | 0730720 | 7/2000 |
| EP | 1088696 A2 | 9/2000 |
| EP | 1050429 A2 | 11/2000 |
| EP | 1075984 A2 | 2/2001 |
| EP | 1123834 A1 | 2/2001 |
| EP | 1266794 | 12/2002 |
| EP | 1075984 B1 | 5/2003 |
| EP | 1323573 A2 | 7/2003 |
| EP | 1349746 B1 | 8/2005 |
| FR | 1266925 | 9/1960 |
| FR | 2599683 | 6/1986 |
| FR | 2630056 | 4/1988 |
| FR | 2630056 | 10/1989 |
| FR | 2694527 | 2/1994 |
| FR | 2845318 | 4/2004 |
| JP | 1171509 | 7/1989 |
| JP | 5-277020 | 10/1993 |
| JP | 8285423 | 11/1996 |
| JP | 10044756 | 2/1998 |
| JP | 2001125990 | 2/2000 |
| JP | 2001071800 | 3/2001 |
| JP | 2002125801 | 5/2002 |
| JP | 2002225539 | 8/2002 |
| JP | 2002234332 | 8/2002 |
| JP | 2003042594 | 2/2003 |
| JP | 2004224108 | 8/2004 |
| JP | 2004283403 | 10/2004 |
| SE | 202556 | 3/1966 |
| SE | 0102983 | 3/2003 |
| WO | 91/12150 A1 | 8/1991 |
| WO | 94/09684 | 5/1994 |
| WO | 96/05475 A1 | 2/1996 |
| WO | 97/09908 | 3/1997 |
| WO | 99/00268 A1 | 1/1999 |
| WO | 02/06914 A1 | 1/2002 |
| WO | 02/005341 A2 | 7/2002 |
| WO | 03/015583 A2 | 2/2003 |
| WO | 03/051666 A1 | 6/2003 |
| WO | 03/077710 A1 | 9/2003 |
| WO | 03/101777 A1 | 12/2003 |
| WO | 03/106215 A1 | 12/2003 |
| WO | WO 03/101777 A1 | 12/2003 |
| WO | 2004/082989 A2 | 3/2004 |
| WO | 2004/028857 A1 | 4/2004 |
| WO | 2004/078517 A2 | 9/2004 |
| WO | 2004/091966 A1 | 10/2004 |
| WO | 2004/091967 A2 | 10/2004 |
| WO | 2004/096601 A1 | 11/2004 |
| WO | 2004/096602 A1 | 11/2004 |
| WO | 2005/021320 A1 | 3/2005 |
| WO | 2005/035305 A1 | 4/2005 |
| WO | 2005/042299 A1 | 5/2005 |
| WO | 2005/042301 A1 | 5/2005 |
| WO | 2005/047056 A1 | 5/2005 |
| WO | 2005/068253 A1 | 7/2005 |
| WO | 2005/110806 A1 | 11/2005 |

OTHER PUBLICATIONS

Provisional U.S. Appl. No. 60/990,389, filed Nov. 27, 2007.
Co-Pending U.S. Appl. No. 11/932,106, filed Oct. 31, 2007.
Co-Pending U.S. Appl. No. 12/013,803, filed Jan. 14, 2008.
Co-Pending U.S. Appl. No. 12/098,599, filed Jul. 4, 2008.
Excerpt from website http://www.seatcomfort.com/semashow1.htm, Specializing in Seat Ventilation and Heating Systems, Seat Comfort Systems Unveils 3 New Seat Heater Products.
Excerpt from website http://www.seatcomfort.com/ventilation.htm, Specializing in Seat Ventilation and Heating Systems, Ventilation.
Excerpt from website http://www.i-car.com/html_pates/about_icar/current_events_news/advantage/advantage I-Car Advantage Online.
International Search Report for Application Serial No. PCT/US03/19929 dated Oct. 10, 2003.
Copending U.S. Appl, No. 09/619,171, filed Jul. 19, 2000.
Automotive Seat Heating Systems, Bauerhin International.
Seat Heating Systems, Kongsberg Automotive, believed to be from website http://www.kongsbert-automotive.no/.
Automotive Heating Seats-Heated Steering Sheets, IGB Automotive Ltd.
GMT 830 heating & Ventilation Systems, IGB Automotive Ltd. Komfortabel bei jeder Temperatur.
Lexus LS430 Conditioned Seat, Pictures of prior products.
Cadillac XLR Conditioned Seat, Pictures or prior products.

* cited by examiner

AIR CONDITIONING SYSTEM FOR A SEAT

TECHNICAL FIELD

The present invention relates to an air-conditioning mechanism for a seat, in particular for a vehicle seat.

BACKGROUND OF THE INVENTION

In air-conditioned vehicle seats or other seating accommodations having air-circulating layers in the region of seat and/or backrest contact surfaces, the problem often arises in the case of stitched seat covers that the regions of a seat or backrest surface separated from one another by stitchings are unevenly air-conditioned, since the flow connection through the cover stitching furrow is insufficient.

In the current state of the art, implementation of cover stitching furrows through a ventilation layer of a knitted spacer fabric is not feasible, either visually or in terms of air-circulation technology. Neither 90° angles nor smooth cushion edges can be formed using known spacer media, so that furrows and cover edges that are made using spacer media do not have a neat appearance. A generally common procedure is to place spacer fabric only in furrow-free regions of the seat and ventilate seat-region surfaces separated from one another by stitching furrows separately from one another in each instance, for example by miniblowers.

U.S. Pat. No. 6,619,737 discloses an air-conditionable vehicle seat which has a ventilation layer, through which air is able to flow, located under a cushion part, as well as an air-permeable upper cushion layer located over this ventilation layer. The cushion is covered with a cushion cover and provided with stitching, along which the cushion cover is connected by fastening means with the upper cushion layer. The ventilation layer extends all the way into the side pieces of the cushion so that the side pieces of the cushion subdivided by stitchings of the seat surface can likewise be supplied with air by the blower for the seat surface for ventilation of the seat. At the same time, in order to obtain a sufficient supply of air for the side pieces, the ventilation layer in the region of the stitchings has a thickness that is almost unchanged.

A vehicle seat of the type mentioned in U.S. Pat. No. 6,619,737, which has a cushion cover with stitchings, is additionally disclosed in U.S. Pat. No. 6,817,675. Here a cushion cover and an upper cushion layer are fastened along the stitchings by fastening means, also bridging the ventilation layer at a lower cushion part. In both of the cases mentioned, a plurality of blowers is used for ventilation of all seat regions.

In addition, an air-conditionable vehicle seat is disclosed in WO 03/101,777 A1. In this case, an air-circulating layer with additional vertical channels is provided, in order also to supply the air-circulating layer with sufficient air-conditioned air through stitched regions of the cover material.

SUMMARY OF THE INVENTION

The present invention provides an air-conditioned seat with at least one cushion layer subdivided by stitchings or the like, in which a uniform and sufficient supply of air to all air-circulating layers located under a cover material is ensured by as simple as possible construction. In particular, the flow connection through the cover stitching furrows is such that a single ventilation device is sufficient for the ventilation of all seat regions.

In one embodiment, an air conditioning mechanism for a vehicle seat is provided. The vehicle seat has at least one cushion with at least one cover and at least two air conditioned zones on a surface facing an occupant, and at least one depression between the zones. The depression has a floor level that is recessed with respect to the air conditioned zones, into which the cover is at least partially drawn in the direction of the floor of the depression. The air conditioned zones and the at least one depression are connected together by an air-permeable connecting mechanism and, the depression, in the transverse direction, is at least partially air-permeable despite the cover. In one example, at least the portion of the cover drawn into the depression is porous, reticulated, perforated, punched or slit. The connecting mechanism can be located between the air conditioned zones essentially on or above the floor level of the at least one depression.

In another aspect, an air-conditioning mechanism for a seat, in particular a vehicle seat, provides that at least two air-conditioned zones of a seat and at least one depression located between the air-conditioned zones are connected together permeable to air by at least one connecting mechanism and that the at least one depression in the transverse direction, despite the cover, is at least partially passable by air. In addition, it is advantageous when the at least one connecting mechanism is located between the air-conditioned zones and the at least one depression, essentially on or above the floor level.

In the present context, air-conditioned zones are regions of a seat in which at least one air-circulating layer is located below a cover material. Such air-circulating layers and air-distribution layers may for example be spacer or distance layers that for example have knitted spacer fabric. Within these layers an air stream may be generated, for example, by a connected blower, which can act to temper the corresponding seat surface region and/or to carry away moisture diffusing into the seat and the air-circulating layer.

In a seat according to the present invention, a largely uniform supply of the air-circulating layers of various air-conditioned regions of the seat with air-conditioned air can be obtained without the depressions lying between them, which for example may be provided with stitchings, resulting in buildup or obstructions in air circulation. In this way, a cover furrow is produced which also ensures air circulation through the furrows into the next cover field.

According to one embodiment of the invention, an elongated depression is formed in a cushion core. On both sides of this depression, at an upper side of the cushion core, there is in each instance located an air-distribution layer for the formation of an air-conditioned zone. A connecting mechanism between the air-conditioned zones and the depression is formed by a channel, 1 to 3 cm wide and about 3 to 8 cm long, molded in the cushion core of the seat. It is provided that a plurality of such channels is in each instance formed in the cushion core transverse to the direction of the course of the depression. The floor level of the connecting channels according to the invention may then be located above, below or at the same level as the floor level of the elongated depression. The depth of the connecting channel need only be sufficient to ensure an air-flow connection of an air-circulating layer of an air-conditioned seat zone to an air-circulating layer of an adjacent air-conditioned seat zone. In addition, the connecting channels run outside the regions in which the fastening or anchoring points of the cover anchoring are found.

The cover may be anchored by at least one auxiliary mechanism, for example by so-called anchor lugs. In each instance, these anchor lugs are connected at an upper edge with the cover edges drawn into the depression and any cover underlayment present and at a lower edge have devices for anchoring in the direction of the floor level of the depression and for fastening of the anchor lugs in the region of the floor level of the depression. According to one aspect of the invention, these anchor lugs are obtained by punching or for example by selection of an air-permeable textile or nonwoven as lug material in such a way that they present no noticeable flow barrier. In this way, an air stream between the air-distribution layers, which are in each instance located on different sides of the furrow on the upper side of the cushion core, is possible through the channels. In a cover anchoring without anchor lugs, for example by anchoring of the cover material itself, care must likewise be taken to see that the material lying in the region of the connecting channel, for example the cover material, is air-permeable or is made at least partially air-permeable.

The air-distribution layers, which for example have knitted spacer fabric, may in each instance, on both sides of the depression or the furrow, reach directly to the depression in the cushion core. However, since known spacer materials harden the edges produced at the furrow and do not permit a free design of the geometric shape of the edge profile, this procedure is not advantageous. Support of the depression edges by material additionally introduced into the edge regions, in particular in the shape of a bead, is advantageous. An additional molded part, for example a square profile, which can be made of sectional foam, preferably is used for support and/or formation of the edge of a depression. Such an additional molded part can be mechanically fastened, for example by cementing or laminating, to the cushion inserts, which also support the air-distribution layers. This ensures simple assembly in the seat structure. An alternative variant is connection of the molded part, for example the profile strip, to the cushion core. Direct molding in the cushion mold foam core is not possible, since removal of such a foam part from the tool is not possible.

Cover furrows according to the invention may be designed according to customers' specifications in their height profile and in their haptic properties. These properties are determined by the molded part placed on the cushion insert or on the cushion core. The entire arrangement is relatively simple to make. The steps for installation in the seat are simple and can be performed quickly. The passage of air between the air-conditioned zones of the seat separated by cover furrows, in particular when a plurality of connecting channels according to the invention are provided, is good enough that a single ventilation device, such as a blower located under the seat, suffices to ventilate all regions of the seat.

BRIEF DESCRIPTION OF THE DRAWINGS

For a more complete understanding of this invention, reference should now be made to the embodiments illustrated in grater detail in the accompanying figures and described below by way of examples of the invention wherein.

DETAILED DESCRIPTION OF THE INVENTION

Figure 1:
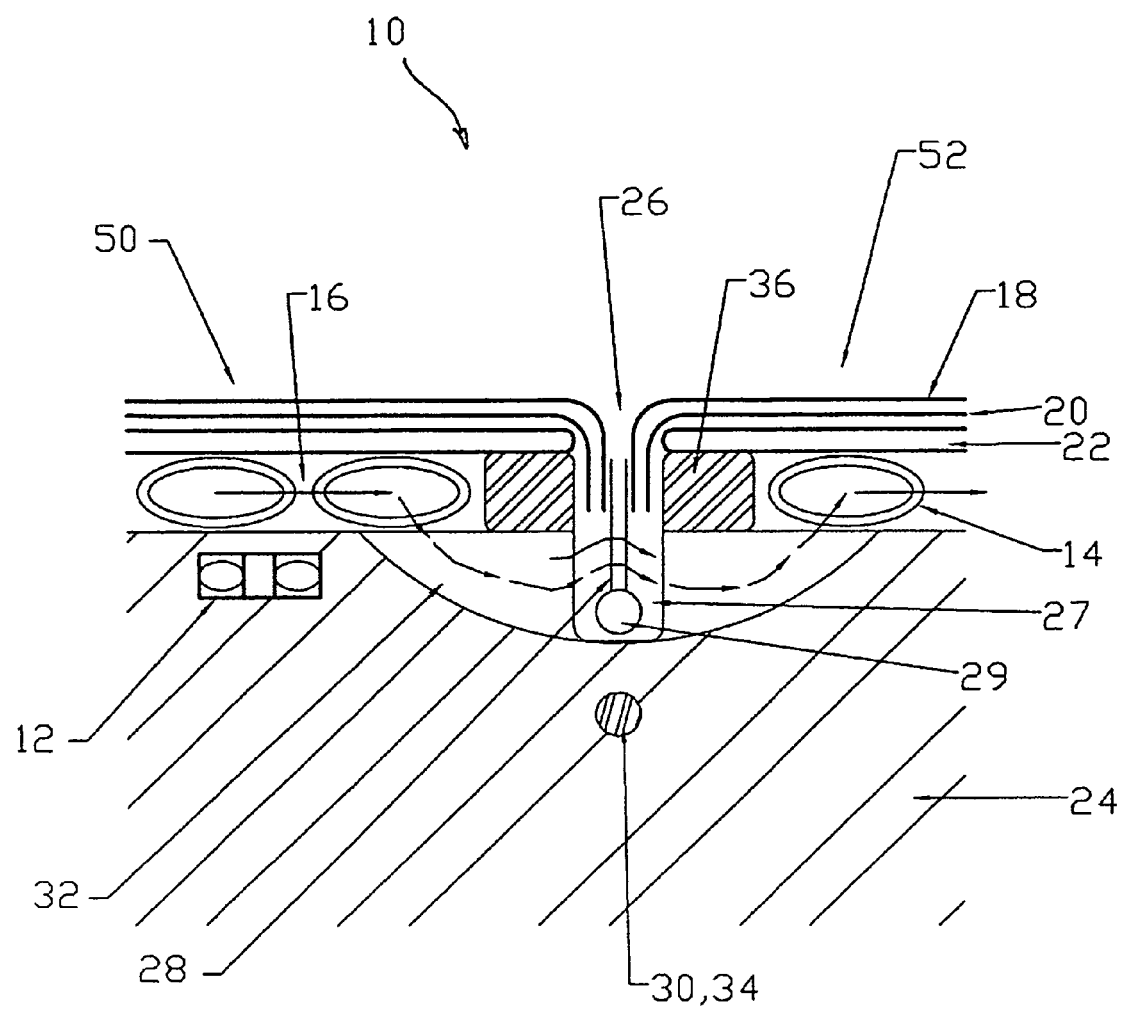
FIG. 1 shows a schematic sectional representation of the structure of a seat arrangement according to one embodiment of the invention.

In the following figures, the same reference numerals are used to refer to the same components. While the present invention is described as an air-conditioning system for use within a vehicle seat, it may be adapted and applied to various systems including other vehicle or non-vehicle systems requiring an air-conditioned surface. In this regard, in the following description, various operating parameters and components are described for several constructed embodiments. These specific parameters and components are included as examples only and are not meant to be limiting.

The schematic sectional view of FIG. 1 illustrates the structure of an air-conditioning system for a vehicle seat 10 according to an embodiment of the invention. A blower 12 delivers air into a distribution layer 14 through which air is able to flow. The distribution layer 14 has the task of distributing the air stream 16 through the entire cushion surface and an air-conditioned zone 50, 52 of the cushion surface, which may be in contact with the passenger; it has for example a spacer fabric uniformly permeable to air in all directions. In the region of the contact surfaces, the air passes through the air-permeable cover superstructure, which is comprised of an air-permeable seat cover 18, the air-permeable cover underlayment 20 and a textile support 22 of a spacer layer. The textile support 22 and the distribution layer 14 in each instance form a structural unit for a cushion region 50, 52. The structural unit is mounted as an insert on the cushion core 24, and in trough-like recesses in the cushion core. The air stream provides for carrying away moisture in the microclimate between passenger and seat 10. In the regions strongly blocked by the passenger, back-ventilation of the contact surface results in sufficient air conditioning, moist air diffusing into the seat being carried away from the contact surface by a transverse flow of air in the distribution layer 14.

The cover stitching furrow 26 divides the air-distribution layer 14 as well as the cushion surface into two or more regions 50, 52, which in known vehicle seats do not have sufficient flow connection.

A cover furrow 26 is produced by an elongated depression 27 in the cushion core 24 running along a straight or curved line, into which the cover 18 is anchored together with the underlayment 20. Anchoring along this line is effected via an anchor lug 28, which is sewn to the cover parts. The anchor lug 28 is fastened by a hook 29 to a wire 30, which is expanded into the cushion core 24 and runs on the floor of the depression 27. Optionally, clamps, which hold the anchor profile in place at individual points in the course of the depression, may alternatively be set into the cushion core 24. The anchor lug band 28 is air-permeable; it usually is made of an air-impermeable textile or nonwoven. The air-distribution layer 14 lying on the surface of the cushion core 24 is interrupted in the region of the depression 27. The depression 27 thus separates two air-conditioned zones 50, 52 of the seat surface from one another.

The present invention provides an airflow connection between the air-conditioned zones 50, 52 and the depression 27 through the cover stitching furrow 26. The connection is produced by channels 32, about 1 to 3 cm wide and about 3 to 8 cm long, formed in the cushion core 24. The channels 32 are depressions in the cushion core 24 running transverse to the direction of the depression 27, which are located outside the regions in which the anchor points 34 of the cover anchoring are found. The anchor lug 28 is formed by punching or optionally by selection of an air-permeable textile as anchor material in such a way that it presents no appreciable flow obstruction. In the region of the channels 32, air is therefore able to flow back and forth virtually unhindered between the air-conditioned zones 50, 52.

Since known spacer materials are not suitable for the molding of edges, the air-distribution layers 14 in the example shown do not reach as far as the edges of the depression 27.

Instead, the edges at the depression 27 are supported by an additional molded part, in the example shown by a square profile 36, which can be sectional foam. The course and shape of the cover stitching furrow 26 may thus be designed in any way desired.

The profile 36 can be mechanically fastened to the cushion insert made of the textile support 22 and the spacer layer 14, for example by cementing or laminating. Simple assembly in construction of the vehicle seat 10 is thereby ensured. An alternative variant provides cementing of the profile strip 36 onto the cushion core 24. However, direct molding in the foam core of the cushion mold may not be possible, since removal of such a foam part from the tool may not be possible.

The spacer material 14 is completely immersed in the cushion core 24 in the manner described. Alternatively, the spacer material itself may also form the edges (not represented), which as mentioned, however, is not advantageous in the case of known spacer materials.

Figure 2:
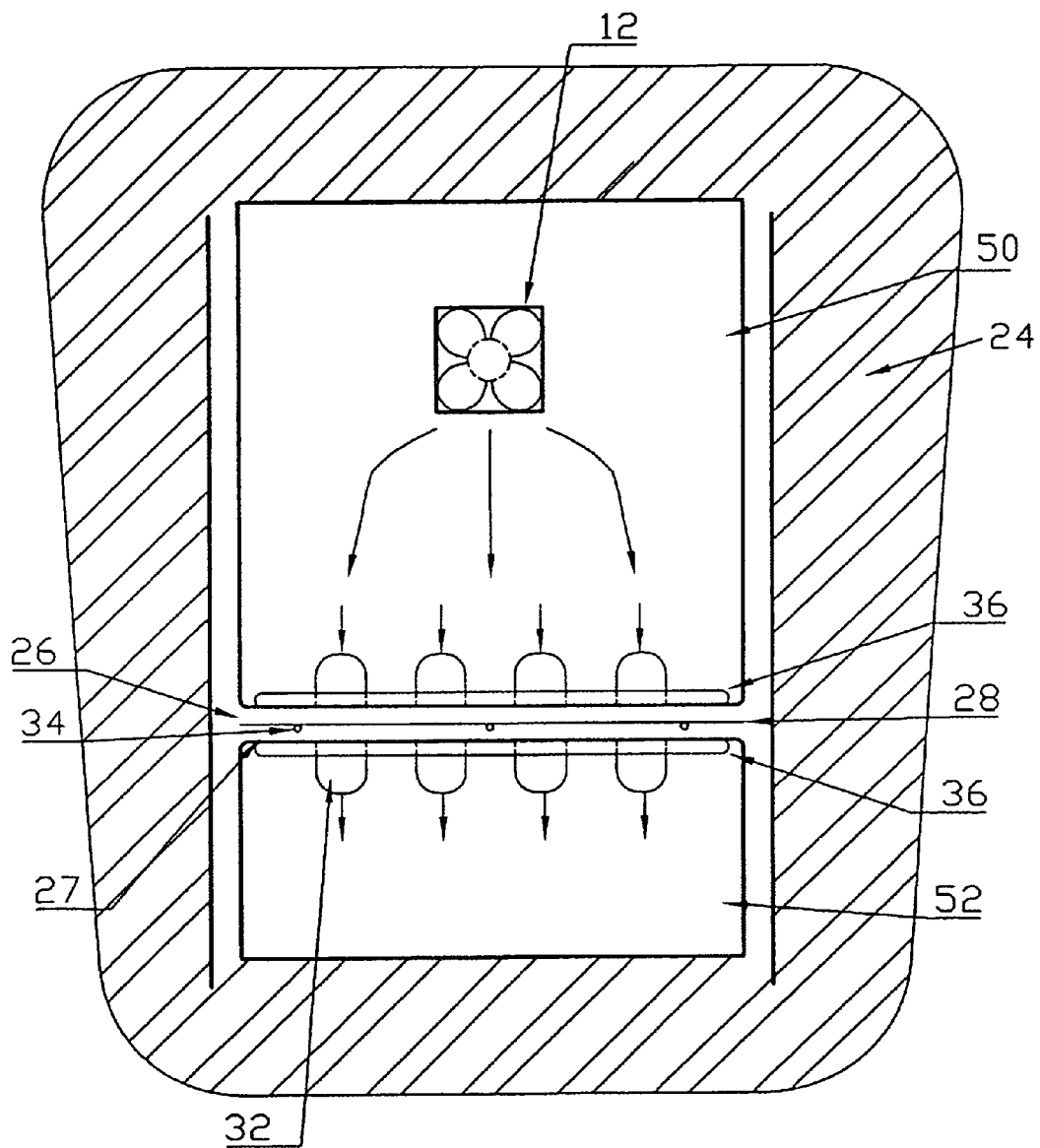
FIG. 2 shows a schematic top view of the seat arrangement of FIG. 1.

The schematic representation of FIG. 2 shows a top view of the seat structure of FIG. 1. There the arrangements of the cover stitching furrow 28 and of the depression 27 in the cushion core 24, as well as the channels 32 running transverse to the latter, can be clearly seen. The channels 32 permit a virtually unhindered stream of air from one air-conditioned seat region 50 to another air-conditioned region 52, separated from the first by the cover furrow 26. The anchor lug 28, by means of which the cover material in the region of the furrow 26 is drawn into the depression 27, is fastened at anchor points 34 in the region of the floor level of the depression 27; these anchor points 34 lie between the connecting channels 32 in the depression 27 in the cushion core 24.

The height profile and shape of the depressions 27 may be largely freely designed according to customers' specifications, since these properties of the profile strip 36 are determined by the profile strip 36 attached to the cushion insert and the latter may be variously shaped as desired.

Not only the transverse furrows of the cover shown, but longitudinal furrows may alternatively be made in the way described. The separation of central parts and side regions of the cushion may likewise be used in the manner described for ventilation, so that complete areal ventilation of the seat contact region becomes possible.

Figure 3:
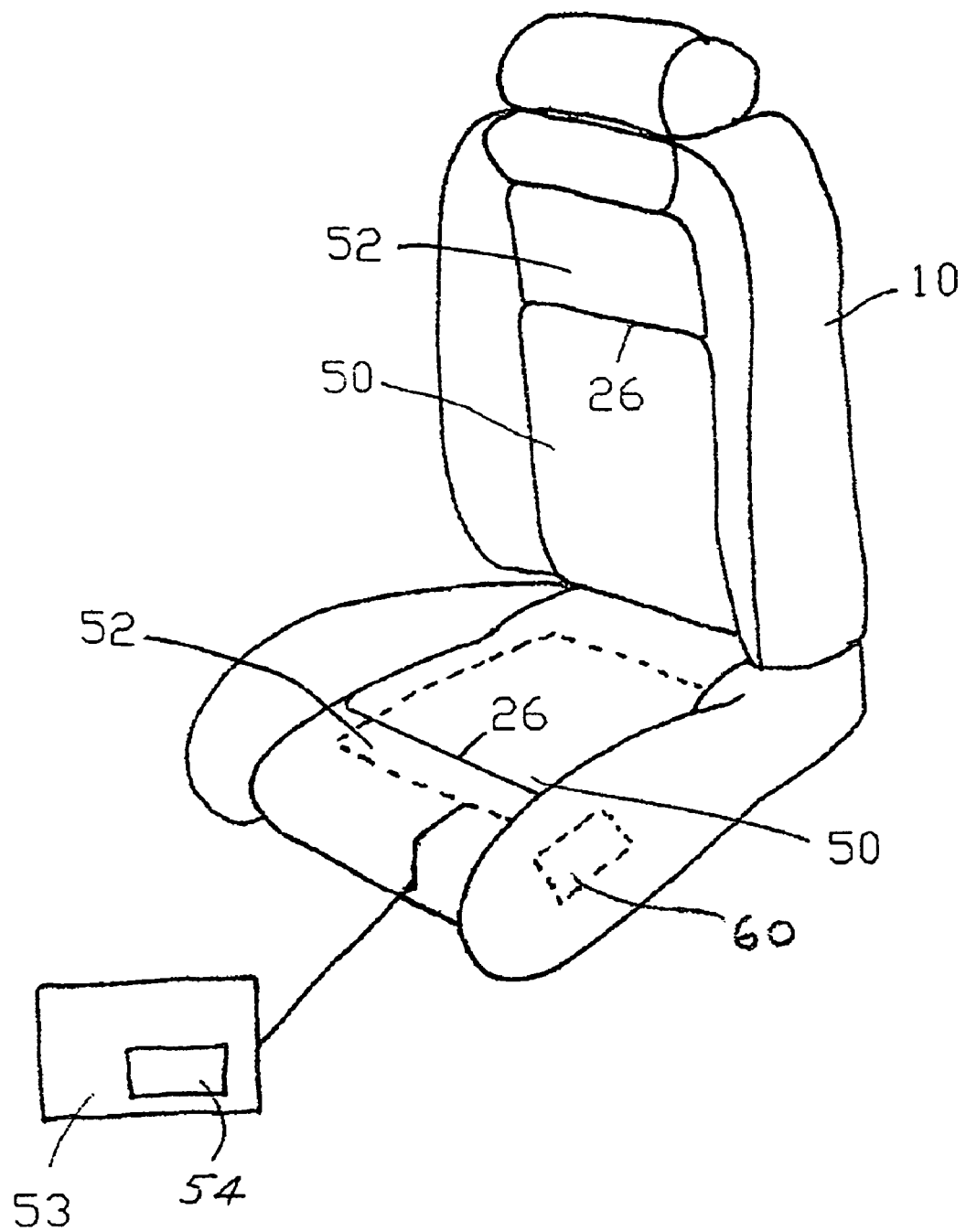
FIG. 3 shows a perspective view and block diagrammatic view of a vehicle seat incorporating an air conditioning system according to an embodiment of the invention.

Referring now to FIG. 3, a perspective and block diagrammatic view of a vehicle seat 10 incorporating an air conditioning system 55 according to an embodiment of the present invention is shown. The air conditioning system 55 is electrically coupled to a controller 53 including a power source 54 by way of a connector. In this example, electrical power is transferred to the air conditioning system 55 to activate the fan/blower to convey air to the zones 50, 52 on either side of the furrow 26. Because of the inventive seat arrangement, only a single fan/blower is required under one of the sections 50, 52. Of course, another air conditioning system could also be incorporated into the backrest to similarly condition that portion of the seat as well. As shown, the system is contained within the seat cover as described above with respect to FIGS. 1 and 2 and is beneath and near the upper surface to provide efficient transfer of air to or from the upper surface.

While the invention has been described in connection with one or more embodiments, it is to be understood that the specific mechanisms and techniques which have been described are merely illustrative of the principles of the invention, numerous modifications may be made to the apparatus described without departing from the spirit and scope of the invention as defined by the appended claims.

What is claimed is:

1. An air-conditioning system for a seat including at least two air-conditioned zones on a seat cushion or a seat back with an air-permeable seat cover, comprising:
    a blower creating an air flow in communication with the at least two air-conditioned zones;
    a cushion core including:
        at least one elongated depression separating the core into the at least two air-conditioned zones,
        at least one channel running traverse to the at least one elongated depression;
    a distribution layer disposed above and in communication with the blower and above the cushion core in the at least two air-conditioned zones; and
    a profile strip disposed along an edge of the at least one elongated depression and spanning at least a portion of the at least one channel;
    wherein the at least two air-conditioned zones are separated by the at least one elongated depression and the profile strip;
    further wherein the air-permeable seat cover includes an air-permeable cover stitching furrow anchored to the bottom of the at least one elongated depression and the air flow communicates between the at least two air-conditioned zones via the at least one channel and at least one elongated depression through the air-permeable cover stitching furrow.

2. The air-conditioning system for a seat according to claim 1, wherein the profile strip is fastened to a cushion insert, the cushion insert comprising at least the profile strip and the distribution layer.

3. The air-conditioning system for a seat according to claim 1, wherein the at least one channel is 1.0 to 3.0 cm wide and 3.0 to 8.0 cm long.

4. The air-conditioning system for a seat according to claim 1, wherein the blower is disposed under only one of the air-conditioned zones.

5. The air-conditioning system for a seat according to claim 1, wherein the profile strip is comprised of sectional foam.

6. The air-conditioning system for a seat according to claim 1, wherein the an air-permeable cover stitching furrow comprises the air-permeable seat cover, and air-permeable underlayment, and an anchor lug.

7. An air-conditioning system for a seat including at least two air-conditioned zones on a seat cushion or a seat back with an air-permeable seat cover, comprising:
    a blower creating an air flow in communication with the at least two air-conditioned zones;
    a cushion core including:
        at least one elongated depression separating the core into the at least two air-conditioned zones;
        at least one channel running traverse to the at least one elongated depression;
    a distribution layer disposed above and in communication with the blower and above the cushion core in the at least two air-conditioned zones;
    a profile strip disposed along an edge of the at least one elongated depression and spanning at least a portion of the at least one channel;
    a textile support layer disposed above in communication with the distribution layer and above the profile strip;
    an air-permeable underlayment disposed above the textile support layer and below the air-permeable seat cover, in communication with both;

wherein the at least two air-conditioned zones are separated by the at least one elongated depression and the profile strip;

further wherein the air-permeable seat cover includes an air-permeable cover stitching furrow anchored to the bottom of the at least one elongated depression and the air flow communicates between the at least two air-conditioned zones via the at least one channel and at least one elongated depression and through the air-permeable cover stitching furrow.

8. The air-conditioning system for a seat according to claim 7, wherein the profile strip is fastened to a cushion insert, the cushion insert comprising the textile support layer and the distribution layer.

9. The air-conditioning system for a seat according to claim 7, wherein the at least one channel is 1.0 to 3.0 cm wide and 3.0 to 8.0 cm long.

10. The air-conditioning system for a seat according to claim 7, wherein the blower is disposed under only one of the air-conditioned zones.

11. The air-conditioning system for a seat according to claim 7, wherein the profile strip is comprised of sectional foam.

12. The air-conditioning system for a seat according to claim 7, wherein the an air-permeable cover stitching furrow comprises the air-permeable seat cover, the air-permeable underlayment, and an anchor lug.

* * * * *